(12) United States Patent
Bruce et al.

(10) Patent No.: US 10,176,235 B2
(45) Date of Patent: Jan. 8, 2019

(54) TECHNIQUES FOR DATA RETENTION

(71) Applicant: salesforce.com, inc., San Francisco, CA (US)

(72) Inventors: Jonathan Mark Bruce, San Rafael, CA (US); Eli Levine, San Francisco, CA (US); Simon Toens, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 343 days.

(21) Appl. No.: 14/542,357

(22) Filed: Nov. 14, 2014

(65) Prior Publication Data
US 2015/0142751 A1    May 21, 2015

Related U.S. Application Data

(60) Provisional application No. 61/905,457, filed on Nov. 18, 2013, provisional application No. 61/904,822, filed on Nov. 15, 2013, provisional application No. 61/904,826, filed on Nov. 15, 2013, provisional application No. 61/905,439, filed on Nov. 18, 2013, provisional application No. 61/905,460, filed on Nov. 18, 2013.

(51) Int. Cl.
*G06F 17/30* (2006.01)

(52) U.S. Cl.
CPC .. *G06F 17/30545* (2013.01); *G06F 17/30424* (2013.01); *G06F 17/30557* (2013.01); *G06F 17/30566* (2013.01); *G06F 17/30569* (2013.01); *G06F 17/30575* (2013.01); *G06F 17/30595* (2013.01); *G06F 17/30607* (2013.01)

(58) Field of Classification Search
CPC ......... G06F 17/30424; G06F 17/30545; G06F 17/30557; G06F 17/30566; G06F 17/30569; G06F 17/30575; G06F 17/30595; G06F 17/30607
USPC .......................................................... 707/662
See application file for complete search history.

(56) References Cited

U.S. PATENT DOCUMENTS 5,577,188 A    11/1996  Zhu
5,608,872 A     3/1997  Schwartz et al.
(Continued)

OTHER PUBLICATIONS

Non-Final Office Action for U.S. Appl. No. 14/542,342 dated Jan. 9, 2017, 6 pages.
(Continued)

*Primary Examiner* — Mark D Featherstone
*Assistant Examiner* — Diedra McQuitery
(74) *Attorney, Agent, or Firm* — Jaffery, Watson, Mendonsa & Hamilton, LLC

(57) ABSTRACT

Managing data in a multitenant environment having a relational database and a non-relational database. A set of one or more policies for data retention corresponding to data stored in the relational database environment is received. The policies for data retention are defined on a tenant-by-tenant basis within the multitenant environment. The policies are deployed to data in the relational database on a tenant-by-tenant basis within the multitenant environment. Data to be copied from the relational database to the non-relational database is identified. The data to be copied in the non-relational database is stored while maintaining tenant isolation so that data belonging to the respective tenants is not accessible by other tenants when stored in the non-relational database.

12 Claims, 7 Drawing Sheets

(56) References Cited

U.S. PATENT DOCUMENTS

| | | | |
|---|---|---|---|
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshaysky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,197,520 B1 | 3/2007 | Matthews et al. | |
| 7,340,411 B2 | 3/2008 | Cook | |
| 7,620,655 B2 | 11/2009 | Larsson et al. | |
| 7,958,159 B1 | 6/2011 | Tran et al. | |
| 9,104,762 B1 | 8/2015 | Ward | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0069077 A1* | 6/2002 | Brophy | G06Q 10/067 705/322 |
| 2002/0072951 A1 | 6/2002 | Lee et al. | |
| 2002/0082892 A1 | 6/2002 | Raffel et al. | |
| 2002/0087552 A1* | 7/2002 | Applewhite | G06F 17/30569 |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120625 A1* | 6/2003 | Jackson | G06F 11/1451 |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2003/0229610 A1 | 12/2003 | Treeck | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2010/0121941 A1 | 5/2010 | Harrang et al. | |
| 2010/0287346 A1 | 11/2010 | Schreter | |
| 2011/0258178 A1 | 10/2011 | Eidson et al. | |
| 2011/0258179 A1 | 10/2011 | Weissman et al. | |
| 2011/0258225 A1* | 10/2011 | Taylor | G06F 17/30336 707/769 |
| 2011/0295839 A1 | 12/2011 | Collins et al. | |
| 2012/0036146 A1 | 2/2012 | Annapragada | |
| 2012/0179762 A1* | 7/2012 | Arora | G06F 17/30312 709/206 |
| 2014/0149400 A1 | 5/2014 | Fu et al. | |
| 2014/0172914 A1 | 6/2014 | Elnikety et al. | |
| 2014/0337276 A1* | 11/2014 | Iordanov | G06F 9/4435 707/602 |
| 2015/0134626 A1 | 5/2015 | Theimer et al. | |

OTHER PUBLICATIONS

Non-Final Office Action for U.S. Appl. No. 14/542,348 dated Feb. 15, 2017, 13 pages.

Non-Final Office Action for U.S. Appl. No. 14/542,353 dated Apr. 4, 2017, 12 pages.

Non-Final Office Action for U.S. Appl. No. 14/542,338 dated Feb. 1, 2017, 14 pages.

Dean, Jeffrey, and Sanjay Ghemawat. "Map Reduce: simplified data processing on large clusters." Communications of the ACM 51.1 (2008): 107-113.

Erickson, Gail, Lubor Kollar, and Jason Ward. "Improving Performance with SOL Server 2000 Indexed Views." Microsoft TechNet, Oct. 2008.

(56) References Cited

OTHER PUBLICATIONS

Final Office Action for U.S. Appl. No. 14/542,342 dated Aug. 28, 2017, 8 pages.
Final Office Action for U.S. Appl. No. 14/542,348 dated Sep. 25, 2017, 18 pages.
Final Office Action for U.S. Appl. No. 14/542,353 dated Oct. 23, 2017, 11 pages.
Final Office Action for U.S. Appl. No. 14/542,338 dated Nov. 6, 2017, 17 pages.
Shook, Adam, and Donald Miner. MapReduce Design Patterns. "O'Reilly Media, Inc.", (2012): Chapter 4.
Dean, Jeffrey, and Sanjay Ghemawat. "MapReduce: simplified data processing on large clusters." Communications of the ACM 51.1 (2008): 107-113. (Year: 2008).
Non-Final Office Action for U.S. Appl. No. 14/542,342 dated May 14, 2018, 5 pages.
Non-Final Office Action for U.S. Appl. No. 14/542,353 dated Mar. 9, 2018, 11 pages.
Non-Final Office Action for U.S. Appl. No. 14/542,338 dated Mar. 13, 2018, 24 pages.
Notice of Allowance for U.S. Appl. No. 14/542,348 dated May 9, 2018, 9 pages.
Final Office Action for U.S. Appl. No. 14/542,353 dated Sep. 14, 2018, 13 pages.
Final Office Action for U.S. Appl. No. 14/542,338 dated Sep. 7, 2018, 18 pages.

* cited by examiner

TECHNIQUES FOR DATA RETENTION

CLAIM OF PRIORITY

This application is related to, and claims priority to, provisional utility application Ser. No. 61/905,457 entitled "ORCHESTRATION BETWEEN TWO MULTITENANT DATABASES," filed Nov. 18, 2013, provisional utility application Ser. No. 61/904,822 entitled "SCALABLE OBJECTS," filed on Nov. 15, 2013, provisional utility application Ser. No. 61/904,826 entitled "MULTI-TENANCY FOR A NOSQL DATABASE," filed Nov. 15, 2013, provisional utility application Ser. No. 61/905,439 entitled "BIG OBJECTS," filed Nov. 18, 2013, and provisional utility application Ser. No. 61/905,460 entitled "FIELD HISTORY RETENTION," filed Nov. 18, 2013, the entire contents of which are all incorporated herein by reference.

TECHNICAL FIELD

Embodiments relate to techniques for storage and management of data. More particularly, embodiments relate to selectively retaining data based on preselected characteristics.

BACKGROUND

Relational databases are commonly used to store large amounts of data. Current relational database systems have limits beyond which the system does not scale well. Thus, environments in which large amount of data must be managed (e.g., on-demand services environments, multitenant database environments, electronic commerce, logistics) may near or reach conditions in which the relational database becomes less effective. Accordingly, current relational database management systems are not ideal in some situations.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
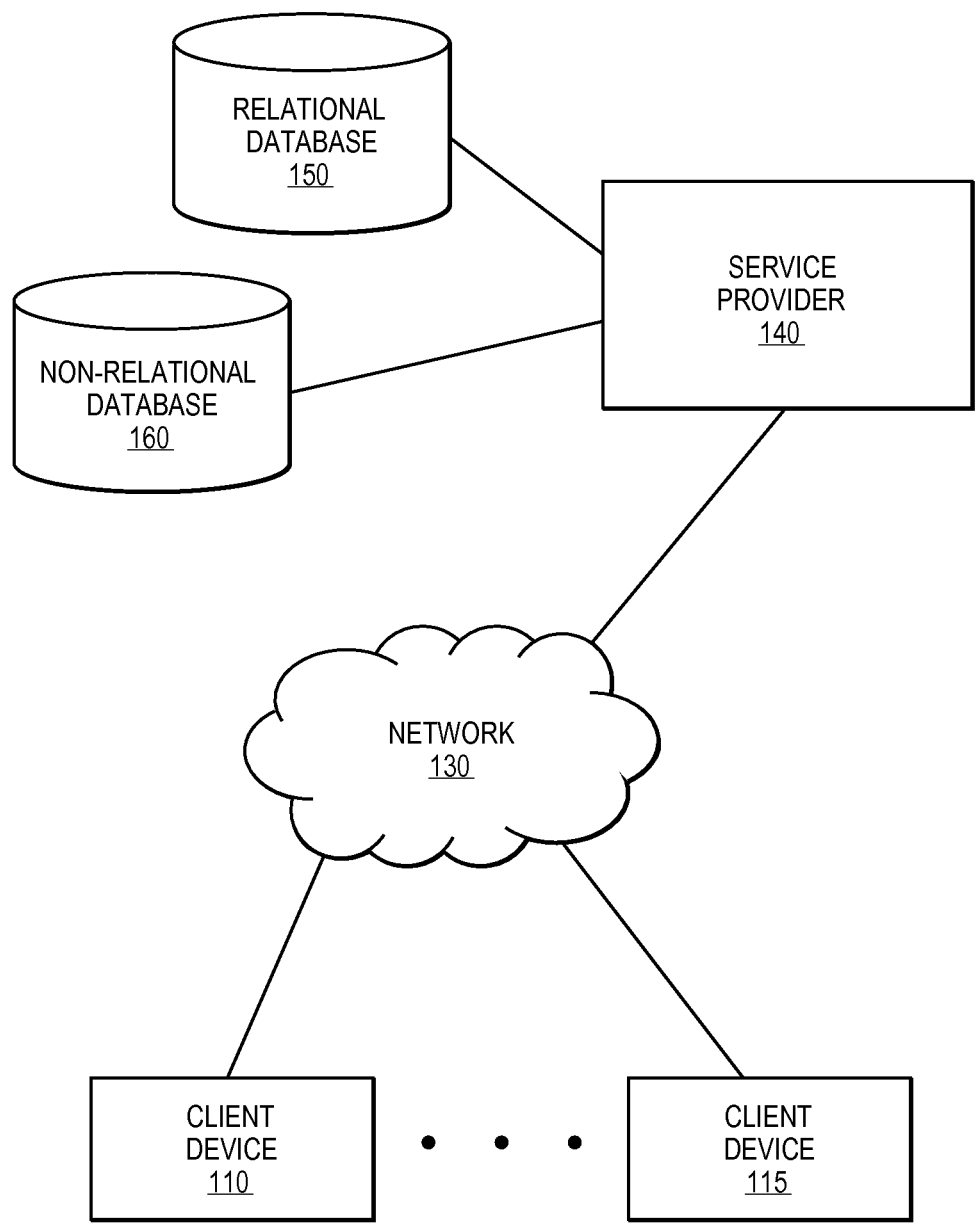
FIG. 1 is a block diagram of one embodiment of an architecture that may provide data retention as described herein.

In the following description, numerous specific details are set forth. However, embodiments of the invention may be practiced without these specific details. In other instances, well-known circuits, structures and techniques have not been shown in detail in order not to obscure the understanding of this description.

As discussed above, there are conditions and/or situations in which a relational database system is being used to manage large amounts of data that does not require the functionality of a relational database system, but is related to data that does. The examples that follow are presented in terms of field history and field history archives; however, the techniques described herein are not limited to these examples.

When records are edited or modified in a relational database environment, entries corresponding to the change can be made. For example, an initial account record may be:

| Account ID | Account Name | Expected Value |
|---|---|---|
| 123456789 | Acme, Inc. | $1,000,000 |

The account record can then me modified, for example, to:

| Account ID | Account Name | Expected Value |
|---|---|---|
| 123456789 | Acme Systems, Inc. | $2,000,000 |

The corresponding field history information can be maintained in another table:

| Field History ID | Parent ID | Old Value | New Value |
|---|---|---|---|
| 0000000001 | 123456789 | Acme, Inc. | Acme Systems, Inc. |
| 000000002 | 123456789 | $1,000,000 | $2,000,000 |

In this simplified example, for each column in the original object that is changed a row is generated in the history table. The history table can be useful for keeping an audit trail, for example With an active environment, the history can grow to a very large number of rows quickly. However, because the data is static after creation and the data is not frequently accessed, the features and flexibility provided by a relational database system may be unused. Thus, a different, more scalable database structure can be utilized for these types of data.

In one embodiment, this type of information can be stored on a non-relational database, for example, Apache HBase, which is an open source non-relational distributed database. Other databases can also be supported. In one embodiment, a JAVA® Database Connectivity (JDBC) driver can be utilized to support low-latency SQL queries to run over the data stored in the non-relational database (e.g., HBase).

A non-relational database can provide better horizontal scalability than a relational database model and provide linear access characteristics, and simpler read and write semantics. In one embodiment, one or more HBase databases can be integrated into a platform (e.g., salesforce) using a framework or interface (e.g., External Objects in salesforce) that allows for data from external sources to be utilized in the platform. In one embodiment, the framework/interface allows for the external database/resource to appear to a user as if it were a part of the platform.

In one embodiment, transfer of data from the relational database environment to the non-relational database environment is not continuous. Transfer of data can occur in response to a request and/or in response to a set of one or more preselected conditions, which can include, for example, exceeding a threshold number of rows in a table, exceeding a threshold database size, and/or available bandwidth. Other conditions can also be used.

In one embodiment, the techniques described herein are provided within a multitenant database environment. Within a multitenant database environment, the conditions that trigger transfer or data and/or the format of the data may vary from tenant to tenant. In one embodiment, each tenant of the multitenant database can have a custom interface that can be utilized to access information in the relational database environment as well as the non-relational database environment.

In one embodiment, the functionality described herein operates to provide a query agent with a JDBC application programming interface (API) from the perspective of a client device. The query agent operates to translate a SQL query (e.g., passed through as a string in the JDBC API) into a series of "native" NoSQL store APIs. In one embodiment, the API to the NoSQL store is at a lower level, so the techniques described herein allow a higher-level query language (e.g., SQL) to be used to read/write data and manage schemas. Various architectures are provided in the description that follows.

FIG. 1 is a block diagram of one embodiment of an architecture that may provide data retention as described herein. In one embodiment, client devices are used by one or more users to access services from a service provider. The service provided can be, for example, an on-demand services environment, a multitenant database environment, or any other type of service provider.

Client devices 110 and 115 operate to allow a user to access remote services provided by service provider 140 via network 130. Client devices 110 can be, for example, desktop computers, laptop computers, tablets, smart phones, thin clients, etc. Network 130 can be any network, for example, the Internet, a corporate local area network or wide area network, a cellular network, and/or any combination thereof.

Service provider 140 can be any number of servers and/or other devices that operate to provide services to one or more client devices. In one embodiment, service provider 140 operates with one or more relational databases (e.g., 150) and one or more non-relational databases (e.g., 160). Service provider 140 operates using relational database 150 and non-relational database 160 as described above.

In one embodiment, service provider 140 is an on-demand services environment with multiple client organizations that provides different and/or different levels of services to the client organizations. For example, service provider 140 can be a multitenant database environment that provides custom interfaces and data isolation to the different client organizations. In the example, multitenant database environment, the transfer of data from relational database 150 and non-relational database 160 can be on an organization-by-organization basis with different parameters and/or conditions for different organizations.

In one embodiment, archival operations are split into two processes, which are independently scheduled and executed: 1) Copy rows from the relational database to the non-relational database; and 2) Delete rows from the relational database that have already been copied over to the non-relational database.

Figure 2:
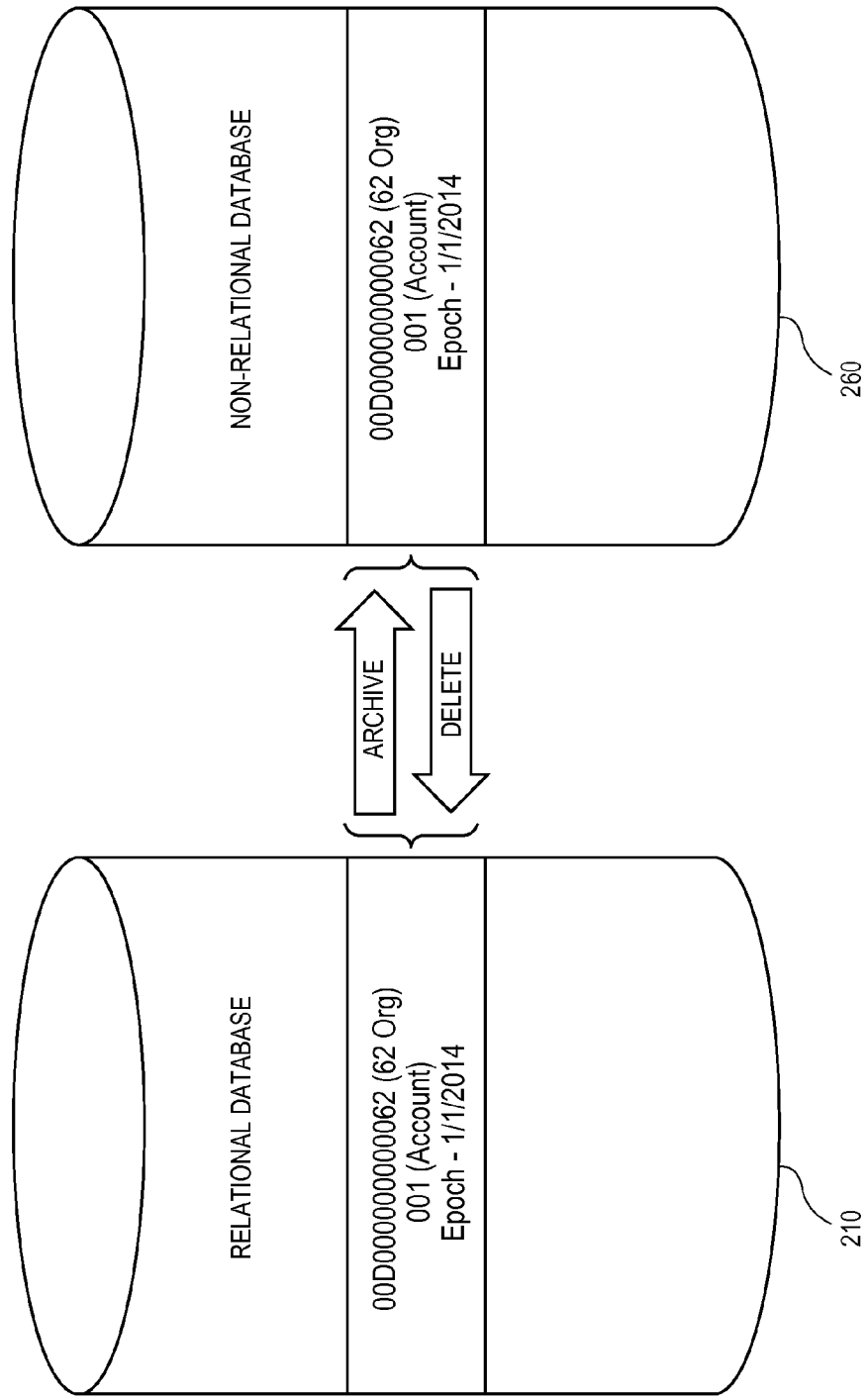
FIG. 2 is a conceptual diagram illustrating archival operations between a relational database and a non-relational database.

FIG. 2 is a conceptual diagram illustrating archival operations between a relational database and a non-relational database. In one embodiment, work is done in "slices," which can be, for example, tenant identifier, key prefix and date range. Slices can be defined with other parameters as well. In one embodiment, the copy process retrieves potential candidates on an instance, groups them by the selected parameters and creates a job for each slice of work, which can further split the rows into chunks that can be processed by an individual message. In one embodiment, the copy operation is driven from relational database 210 using a query per partition to find potential rows.

In one embodiment, the delete process is driven from non-relational database 260. For a particular parameter combination, non-relational database 260 is queried to determine if the row exists (ensuring the copy process was successful), before causing the corresponding data to be deleted from relational database 210.

Figure 3:
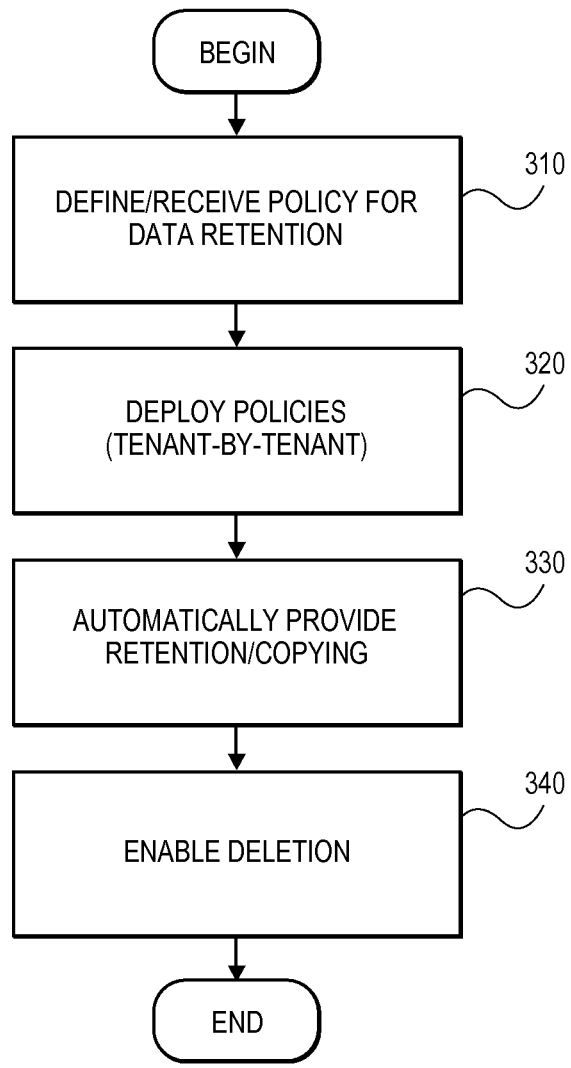
FIG. 3 is a flow diagram of one embodiment of a technique for providing data archival functionality in a multitenant environment.

FIG. 3 is a flow diagram of one embodiment of a technique for providing data archival functionality in a multitenant environment. In one embodiment, within a multitenant environment, data from a relational database system is archived in a non-relational database system based on a set of policies determined by the individual tenants.

A policy for data retention (e.g., field history retention) is defined and/or received, 310. A data retention policy can define what data to copy from the relational database (e.g., 210) to the non-relational database (e.g., 260), how to copy the data, how long to retain the data in the relational database after the copy, how long to retain the data in the non-relational database after the copy, when to copy the data and/or any other relevant parameters. The policies can be provided as default settings, in response to user input, received via a file or other data structure, etc. For example, data in the relational database older than 18 months can be copied to the non-relational database and stored there for 60 months.

In the example of field history retention, end users can utilize an application programming interface (API) to provide metadata for retention and/or archival jobs. In one embodiment, the policies are provided and implemented on a tenant-by-tenant basis in a multitenant environment. Retention/archival policies can include parameters such as field type, beginning date, end date, object type. Associated status fields can also be maintained, for example, the number of rows retained, queue copy status information, etc.

The policies can then be deployed, 320. Deployment of the policies can include, for example, setting up job handlers or other mechanisms to automatically enforce/provide the policies defined previously. In one embodiment, the multitenant environment can provide this mechanism for each tenant so that each tenant can have a tenant-specific set of policies to be enforced. As another example, each tenant can have its own mechanism to deploy the policies.

The multitenant environment provides automatic retention/archival copying according to the policies, 330. The environment can provide a mechanism to periodically (or even continuously) monitors for data fields that satisfy the policy parameters. Example techniques for the copy operations to move data from the relational database to the non-relational database are provided in greater detail below.

Deletion is enabled, 340, after copying has been performed. As discussed above, deletion can be detached from the copy operations. Example techniques for deletion operations are discussed in greater detail below.

Figure 4:
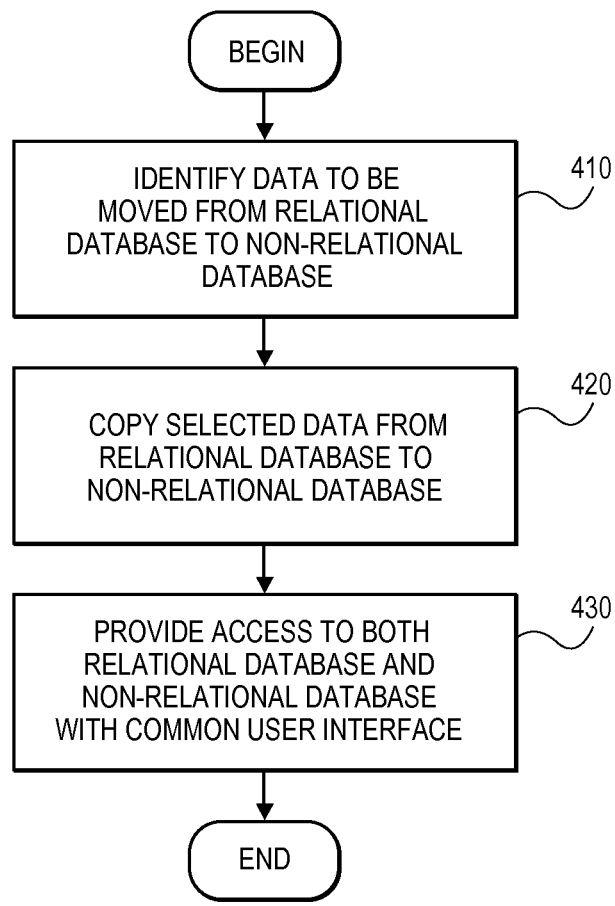
FIG. 4 is a flow diagram of one embodiment of a technique for transferring data from a relational database environment to a non-relational database environment.

FIG. 4 is a flow diagram of one embodiment of a technique for transferring data from a relational database environment to a non-relational database environment. Data to be moved from the relational database environment to the non-relational database environment is identified, 410. Various parameters and conditions are used to determine what data is to be moved/copied/transferred.

In a multitenant database example, not all organizations/tenants may have the functionality to copy data from the relational database to the non-relational database as described. That is, the functionality may be provided on a tenant-by-tenant basis. Further, the fields and/or data that can be copied can be limited/determined/etc. on a tenant-by-tenant basis. In one embodiment, the data to be copied for a particular tenant is based on a key prefix and/or date (e.g., field history, older than a specified date).

The selected data is copied form the relational database to the non-relational database, 420. In one embodiment, a message is enqueued with the parameters (e.g., field history, older than a specified date) for the data to be copied. In one embodiment, the message is used to handle copying of the data in batches. For example, when a chunk of rows have been processed, the message (or a variation) is enqueued again to handled the next chunk of rows until all of the specified data has been copied.

In one embodiment, a chunk of data to be copied is delineated by a data range and an offset. The offset is used to prevent re-loading of rows that have already been copied. In one embodiment, when the selected data has been copied, a message handler marks the current job as successful and can insert a row in the source table to help track what data has been copied. Data can then be deleted from the relational database.

Access to the copied data is then provided with a common user interface, 430, so that the user has access to the copied data that is stored in the non-relational database environment. In one embodiment, the interface providing access to the relational database environment also includes virtual entity or other interface to the non-relational database to allow the user seamless access to data copied from the relational database environment to the non-relational database environment.

In contrast to turning SQL queries into batch-oriented map/reduce jobs, the techniques described herein can be utilized to transform the SQL queries into a set of HBase (or other non-relational database) scans that can be executed in parallel for each row key range. In one embodiment, these scans are executed in parallel for each row key range and can be combined to provide results of the query. As a result, the latency of the queries is low enough to allow data to drive analytic-type queries over large amounts of data. In one embodiment, all this is hidden behind a JDBC driver. In one embodiment, the user provides a schema for their database table data and a SQL query. In one embodiment, column values can be be mapped to individual KeyValues and/or combined together in a single KeyValue to reduce the size of data, which can improve read speed.

Figure 5:
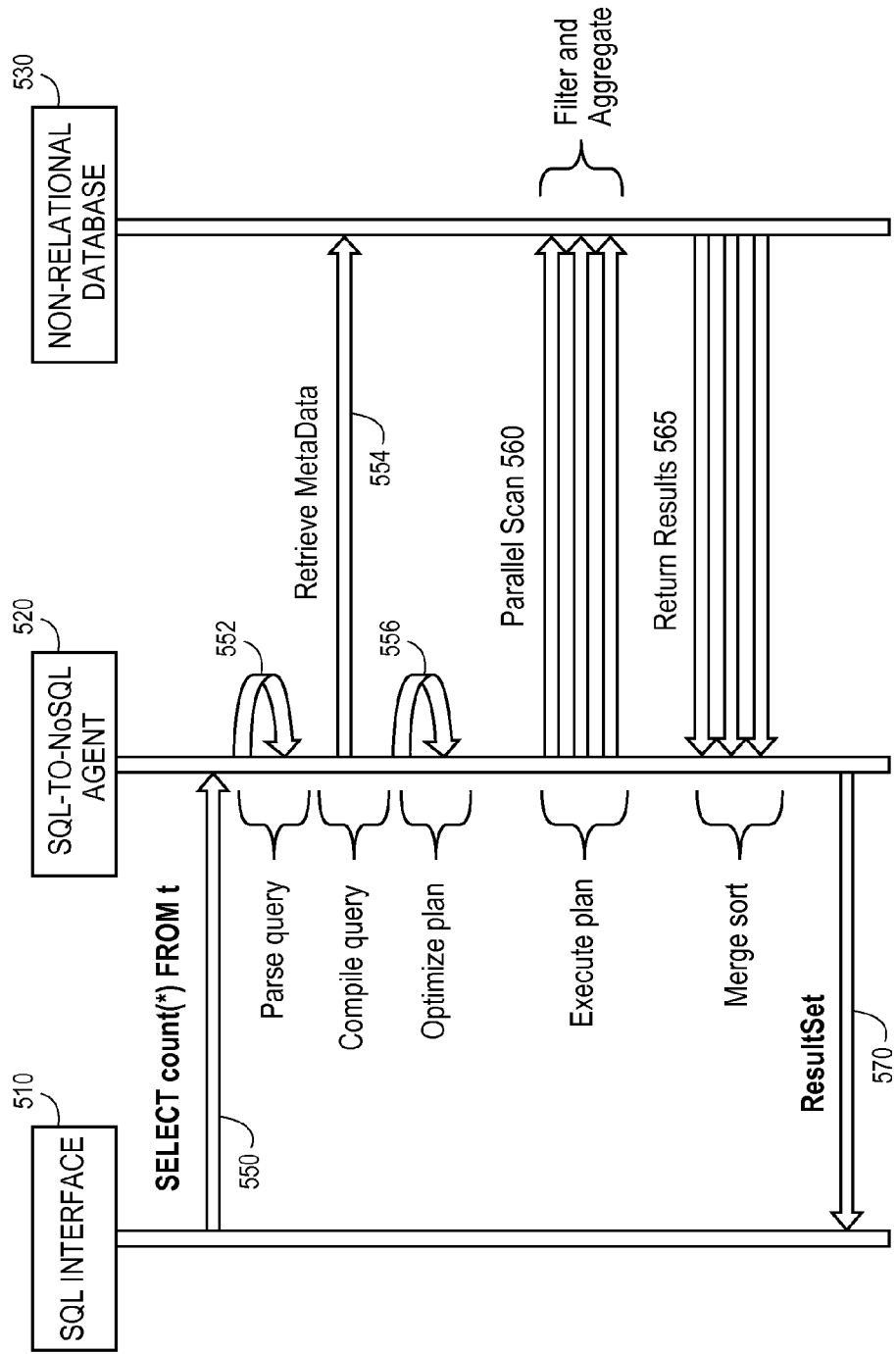
FIG. 5 is an interaction diagram of one embodiment of a technique for querying a non-relational (NoSQL) database using relational database (SQL) commands.

FIG. 5 is an interaction diagram of one embodiment of a technique for querying a non-relational (NoSQL) database using relational database (SQL) commands. In one embodiment, the technique of FIG. 5 is performed within a multitenant database environment.

SQL interface 510 is any type of interface/client device that can be used to receive SQL commands and provide results form the SQL commands. For example, SQL interface 510 can be a SQL application running on a client computing device. SQL-to-NoSQL agent 520 provides the functionality described herein. SQL-to-NoSQL agent 520 may be a centralized single agent or can be distributed over multiple entities. Non-relational database 530 can be any type of non-relational database, for example, HBase.

In response to receiving at least one SQL command representing a query, SQL interface 510 sends the query, 550, to SQL-to-NoSQL agent 520. In response to receiving the SQL command, SQL-to-NoSQL agent 520 parses the query, 552. SQL-to-NoSQL agent 520 then compiles a query, which can include retrieving metadata, 554, from non-relational database 530. The query plan can be optimized, 556. In one embodiment the SQL query is transformed into one or more scans that are relatively simple, for example, with no joins, basic filtering and/or simple aggregation.

In one embodiment, the scans can be run on a sub-section of tables so that not all tables need to be replicated in the non-relational database. In some embodiments, the results need only be approximately correct. Other optimizations can be utilized to provide the desired level of performance.

The query plan can be executed as multiple parallel scans, 560, of non-relational database 530. In one embodiment, a set of HBase (or other non-relational database) scans that can be executed in parallel for each row key range. In one embodiment, these scans are executed in parallel for each row key range and can be combined to provide results of the query.

In one embodiment, non-relational database 530 can perform filtering and/or aggregation. Results of the multiple parallel scans are returned, 565, to SQL-to-NoSQL agent 520. In one embodiment, SQL-to-NoSQL agent 520 can perform merge sorting on the results. By combining the results of the one or more scans, the system can provide an aggregated/unified result to the original SQL query. The results are provided, 570, to SQL interface 510.

In one embodiment, deletion from the relational database environment is decoupled from the copy process. In embodiment, a system job in the relational database environment periodically (e.g., daily, weekly, 12 hours) runs to query tenants/organizations that have the functionality described herein enabled to determine whether any data copy jobs have been completed. If so, the data that has been copied to the non-relational database environment may be deleted from the relational database environment.

In one embodiment, when a deletion message/job is processed, the handler determines the parameters (e.g., field history, older than a specified date) for the deletion request. In one embodiment, this is accomplished with a system-level job. It can, for example, fun a query to find all organizations that have post-archival deletion enabled and have post-archival deletion requests that have not been processed. In one embodiment, the system-level job can enqueue a message for each combination. In one embodiment, other job types (e.g., an organization-level job) can be utilized to process deletions.

The non-relational database can be queried to determine the data within the specified range. For each chunk, the handler passes identifiers loaded from the non-relational database environment to the relational database environment to cause a hard delete of the corresponding rows from the relational database environment. Loading the identifiers from the non-relational database environment to the relational database environment ensures that data will not be deleted before being successfully copied from the relational database environment to the non-relational database environment.

Figure 6:
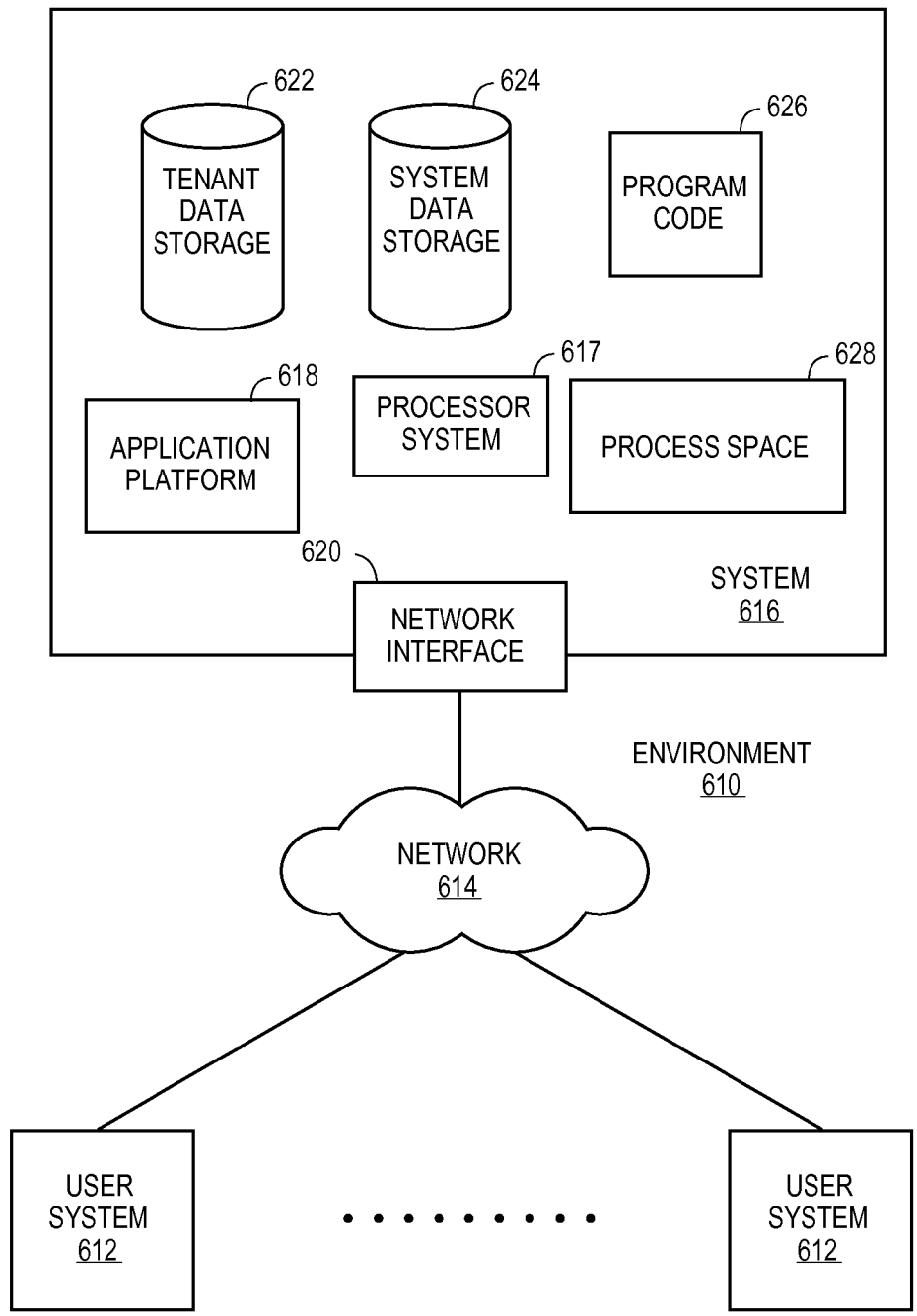
FIG. 6 is a block diagram of one environment wherein an on-demand database service might be used.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline back-ups or other redundancies, etc., and might include a distributed database or storage network and associated processing intelligence.

Figure 7:
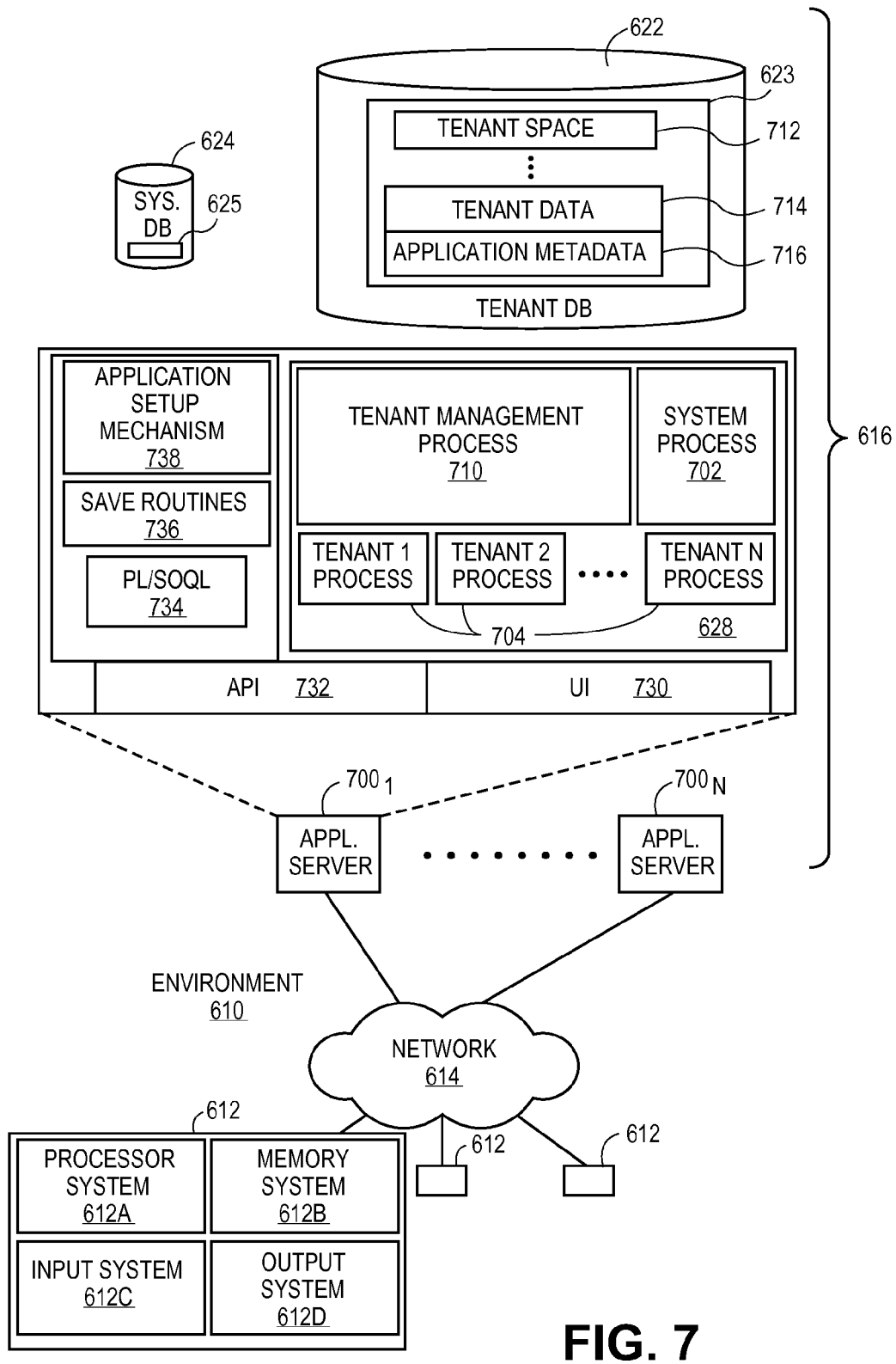
FIG. 7 is a block diagram of one embodiment of elements of environment of FIG. 6 and various possible interconnections between these elements.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$400_N$, system process space 702, tenant process spaces 704, tenant management process space 710, tenant storage space 712, tenant data 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage spaces 712, which can be either a physical arrangement and/or a logical arrangement of data. Within each tenant storage space 712, tenant data 714 and application metadata 716 might be similarly allocated for each user. For example, a copy of a user's most recently used (MRU) items might be stored to tenant data 714. Similarly, a copy of MRU items for an entire organization that is a tenant might be stored to tenant storage space 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method of managing data in a multitenant environment having a relational database and a non-relational database, the method comprising:
   receiving, with one or more server computing systems that provide the multitenant environment, a set of one or more policies for field history data retention corresponding to data stored in a history table in the relational database environment, wherein the policies for data retention are defined on a tenant-by-tenant basis within the multitenant environment, wherein the one or more policies for data retention define what data is to be copied from the relational database to the non-relational database, how to copy the data, how long to retain the data in the relational database after the copy and how long to retain the data in the non-relational database after the copy;
   deploying, with the one or more computing systems that provide the multitenant environment, the policies to data in the relational database on a tenant-by-tenant basis within the multitenant environment;
   identifying, with the one or more computing systems that provide the multitenant environment and according to the policies, data to be copied from the relational database to the non-relational database, wherein the data to be copied comprises at least field history information indicating changes made to one or more fields in the relational database and the non-relational database provides a field history archive;
   storing the data to be copied in the non-relational database while maintaining tenant isolation so that data belonging to the respective tenants is not accessible by other tenants when stored in the non-relational database utilizing a two-stage archival operation where each of the two stages are independently scheduled and executed, the first stage to copy rows from the relational database to the non-relational database and the second stage to delete rows from the relational database that have been copied to the non-relational database; and
   providing access to the data from the non-relational database via a user interface that accesses both the relational database and the non-relational database, wherein searching of the data stored in the non-relational database comprises transforming a query in a relational database language to multiple parallel scans of the non-relational database to retrieve result data and merging results of the multiple parallel scans to present the result data.

2. The method of claim 1 further comprising:
   enabling deletion of the data stored in the non-relational database from the relational database; and
   causing the data stored in the non-relational database to be deleted from the relational database according to tenant-specific deletion policies.

3. The method of claim 1 wherein the copying the data from the relational database to the non-relational database comprises:
   receiving a key prefix to identify the data to be copied;
   splitting the data to be copied into at least a first batch and a second batch;
   copying a first batch of data from the relational database to the non-relational database;
   automatically, in response to copying the first batch, enqueuing a second batch of data to be copied from the relational database to the non-relational database.

4. A non-transitory computer-readable medium having stored therein instructions to cause one or more processors to manage data in a multitenant environment having a relational database and a non-relational database, the instructions, when executed by the one or more processors, to:
   receive, with one or more server computing systems that provide the multitenant environment, a set of one or more policies for field history data retention corresponding to data stored in a history table in the relational database environment, wherein the policies for data retention are defined on a tenant-by-tenant basis within the multitenant environment, wherein the one or more policies for data retention define what data is to be copied from the relational database to the non-relational database, how to copy the data, how long to retain the data in the relational database after the copy and how long to retain the data in the non-relational database after the copy;
   deploying, with the one or more computing systems that provide the multitenant environment, the policies to data in the relational database on a tenant-by-tenant basis within the multitenant environment;
   identify, with the one or more computing systems that provide the multitenant environment and according to the policies, data to be copied from the relational database to the non-relational database, wherein the data to be copied comprises at least field history information indicating changes made to one or more fields in the relational database and the non-relational database provides a field history archive;
   store the data to be copied in the non-relational database while maintaining tenant isolation so that data belonging to the respective tenants is not accessible by other tenants when stored in the non-relational database utilizing a two-stage archival operation where each of the two stages are independently scheduled and executed, the first stage to copy rows from the relational database to the non-relational database and the second stage to delete rows from the relational database that have been copied to the non-relational database; and provide access to the data from the non-relational database via a user interface that accesses both the relational database and the non-relational database, wherein searching of the data stored in the non-relational database comprises transforming a query in a relational database language to multiple parallel scans of the non-relational database to retrieve result data and merging results of the multiple parallel scans to present the result data.

5. The non-transitory computer-readable medium of claim 4 further comprising instructions that, when executed by the one or more processors, cause the one or more processors to:

enable deletion of the data stored in the non-relational database from the relational database; and cause the data stored in the non-relational database to be deleted from the relational database according to tenant-specific deletion policies.

6. The non-transitory computer-readable medium of claim 4 wherein the instructions that cause the one or more processors to copy the data from the relational database to the non-relational database comprise instructions that, when executed by the one or more processors, cause the one or more processors to:

receive a key prefix to identify the data to be copied;
split the data to be copied into at least a first batch and a second batch;
copy a first batch of data from the relational database to the non-relational database;
automatically, in response to copying the first batch, enqueue a second batch of data to be copied from the relational database to the non-relational database.

7. A system for managing data in a multitenant environment having a relational database and a non-relational database, the system comprising:

a server computing device to provide services to one or more remote client computing devices;

a database management environment to support services provided by the server computing device, the database management environment to receive a set of one or more policies for field history data retention corresponding to data stored in a history table in the relational database environment, wherein the policies for data retention are defined on a tenant-by-tenant basis within the multitenant environment, to deploy the policies to data in the relational database on a tenant-by-tenant basis within the multitenant environment, wherein the one or more policies for data retention define what data is to be copied from the relational database to the non-relational database, how to copy the data, how long to retain the data in the relational database after the copy and how long to retain the data in the non-relational database after the copy, to identify, according to the policies, data to be copied from the relational database to the non-relational database, wherein the data to be copied comprises at least field history information indicating changes made to one or more fields in the relational database and the non-relational database provides a field history archive, to store the data to be copied in the non-relational database while maintaining tenant isolation so that data belonging to the respective tenants is not accessible by other tenants when stored in the non-relational database utilizing a two-stage archival operation where each of the two stages are independently scheduled and executed, the first stage to copy rows from the relational database to the non-relational database and the second stage to delete rows from the relational database that have been copied to the non-relational database, and to provide access to the data from the non-relational database via a user interface that accesses both the relational database and the non-relational database, wherein searching of the data stored in the non-relational database comprises transforming a query in a relational database language to multiple parallel scans of the non-relational database to retrieve result data and merging results of the multiple parallel scans to present the result data.

8. The system of claim 7, wherein the database management environment is further configured to enable deletion of the data stored in the non-relational database from the relational database, and to cause the data stored in the non-relational database to be deleted from the relational database according to tenant-specific deletion policies.

9. The system of claim 7 wherein the copying the data from the relational database to the non-relational database comprises:

receiving a key prefix to identify the data to be copied;
splitting the data to be copied into at least a first batch and a second batch;
copying a first batch of data from the relational database to the non-relational database;
automatically, in response to copying the first batch, enqueuing a second batch of data to be copied from the relational database to the non-relational database.

10. An apparatus for managing data in a multitenant environment having a relational database and a non-relational database, the apparatus comprising:

means for receiving, with one or more server computing systems that provide the multitenant environment, a set of one or more policies for field history data retention corresponding to data stored in a history table in the relational database environment, wherein the policies for data retention are defined on a tenant-by-tenant basis within the multitenant environment, wherein the one or more policies for data retention define what data is to be copied from the relational database to the non-relational database, how to copy the data, how long to retain the data in the relational database after the copy and how long to retain the data in the non-relational database after the copy;

means for deploying, with the one or more computing systems that provide the multitenant environment, the policies to data in the relational database on a tenant-by-tenant basis within the multitenant environment;

means for identifying, with the one or more computing systems that provide the multitenant environment and according to the policies, data to be copied from the relational database to the non-relational database, wherein the data to be copied comprises at least field history information indicating changes made to one or more fields in the relational database and the non-relational database provides a field history archive;

means for storing the data to be copied in the non-relational database while maintaining tenant isolation so that data belonging to the respective tenants is not accessible by other tenants when stored in the non-relational database utilizing a two-stage archival operation where each of the two stages are independently scheduled and executed, the first stage to copy rows from the relational database to the non-relational database and the second stage to delete rows from the relational database that have been copied to the non-relational database; and means for providing access to the data from the non-relational database via a user interface that accesses both the relational database and the non-relational database, wherein searching of the data stored in the non-relational database comprises transforming a query in a relational database language to multiple parallel scans of the non-relational database to retrieve result data and merging results of the multiple parallel scans to present the result data.

11. The apparatus of claim 10 further comprising:

means for enabling deletion of the data stored in the non-relational database from the relational database; and means for causing the data stored in the non-relational database to be deleted from the relational database according to tenant-specific deletion policies.

12. The apparatus of claim 10 wherein the means for copying the data from the relational database to the non-relational database comprises:

means for receiving a key prefix to identify the data to be copied;

means for splitting the data to be copied into at least a first batch and a second batch;

means for copying a first batch of data from the relational database to the non-relational database;

means for automatically, in response to copying the first batch, enqueuing a second batch of data to be copied from the relational database to the non-relational database.

* * * * *